United States Patent [19]

Sharp et al.

[11] Patent Number: 5,435,779
[45] Date of Patent: Jul. 25, 1995

[54] PRECISION GAS FLOW CONTROL BY USE OF COARSE AND FINE CONTROL ELEMENTS

[75] Inventors: Gordon P. Sharp, Newton, Mass.;
Eric Desrochers, Nashua, N.H.

[73] Assignee: Phoenix Controls Corporation, Newton, Mass.

[21] Appl. No.: 145,846

[22] Filed: Nov. 2, 1993

Related U.S. Application Data

[63] Continuation-in-part of Ser. No. 86,648, Jul. 2, 1993, Pat. No. 5,385,505.

[51] Int. Cl.$^6$ .............................................. B08B 15/02
[52] U.S. Cl. ........................................ 454/61; 454/238
[58] Field of Search .......................... 454/58, 59, 61, 70, 454/238, 255, 340

[56] References Cited

U.S. PATENT DOCUMENTS 5,304,093  4/1994  Sharp et al. ............................ 454/61

FOREIGN PATENT DOCUMENTS 223545  1/1987  Japan .................................... 454/255

*Primary Examiner*—Harold Joyce
*Attorney, Agent, or Firm*—Wolf, Greenfield & Sacks

[57] ABSTRACT

Precision gas flow control is provided utilizing a first coarse gas flow control element and a second fine gas flow control element. The second element is selected and operated to pass only a fraction of the flow passed by the first element. The elements may be connected either in series or in parallel so that at least a portion of the gas flow passes through each flow control element. Control circuitry is also provided which may be responsive at least in part to an indication of desired gas flow through the device for controlling the first element to provide a coarse gas flow adjustment and for controlling the second element to provide a fine gas flow adjustment. In some applications, only fine flow adjustment may be provided. Where the elements are being utilized for example as the tracking flow control elements for a sealed enclosure, either the fine flow control element or both elements may also be made responsive to pressure errors in the enclosure.

17 Claims, 5 Drawing Sheets

PRECISION GAS FLOW CONTROL BY USE OF COARSE AND FINE CONTROL ELEMENTS

RELATED APPLICATIONS

This application is a continuation-in-part of application Ser. No. 08/086,648, filed Jul. 2, 1993 U.S. Pat. No. 5,385,505.

FIELD OF THE INVENTION

This invention relates to method and apparatus for gas flow control and more particularly to precision gas flow control utilizing both a coarse gas flow control element and a fine gas control flow element. One embodiment of the invention is particularly adapted-for use in precisely controlling the pressure in a sealed room.

BACKGROUND OF THE INVENTION

Gas flow control elements such as valves and dampers are utilized in a variety of applications including the control of gas flow either into or out of a selected enclosure or other area. Examples of applications where such flow control elements are utilized include fume hood controllers and controllers for maintaining a selected positive or negative pressure in a sealed environment for clean room or containment purposes, respectively.

While in many such applications, system tolerances are such that precise flow control is not required, there are applications, for example high level containment sealed rooms, where precision control of flow is required in order to precisely maintain a desired pressure level within the room. Valves or other flow control elements which, either because of small size or of operating point, are being used to provide low flow rates are generally resolvable within a few cubic feet per minute (cfm), thus providing the desired precision control. However, since the resolvability of such devices frequently varies as a function of flow, precision control to a few cfm is generally not possible in existing systems where larger elements operating at higher cfm are being utilized. A need, therefore, exists for an improved flow control device which permits precision flow control to be achieved over the entire operating flow range of the system, including at relatively high flow rates.

In particular, in a clean room or containment situation where a selected offset in flow between supply and exhaust air flow is maintained to achieve and maintain a selected relatively precise positive or negative pressure level in the room, fine adjustments in flow through the slave or tracking flow controller may be required in order to maintain the desired room pressure. This problem is discussed in greater detail in the parent application. However, existing systems which may be required to move relatively large air volumes for a large sealed room to maintain, for example, a minimum of 10 changes in air per hour, have difficulty in making the small adjustments in exhaust fluid flow necessary to precisely maintain room pressure. A need, therefore, exists for an improved gas flow control device which is capable of providing precise gas flow control regardless of gas flow rate through the controller, and in particular for such a device which can be used in a sealed room/enclosure to permit precision pressure control at high gas flow volumes.

SUMMARY OF THE INVENTION

In accordance with the above, this invention provides a precision gas flow control by use of parallel or series connected first and second gas flow control elements, with the second gas flow control element being operative to pass only a fraction of the flow passed by the first element. This may be accomplished by selecting a second element which is significantly smaller than the first element and/or by operating the second element at a low flow portion of its operating curve. Generally, the second element is controlled to provide fine flow adjustments to the gas flow. More specifically, a flow signal may be provided which is indicative of desired gas flow and control circuitry may be provided which is responsive at least in part to the flow signal for controlling the first element to provide a coarse gas flow adjustment to the gas flow and to control the second element to provide a fine gas flow adjustment to the gas flow.

The flow control elements may be substantially pressure independent elements although, in some applications, such as sealed room applications, it is desirable that at least one of the elements provide some leakage (i.e. have some pressure dependence). Both flow control elements may for example be venturi valves with the venturi valve for the first flow control element being larger than the valve for the second flow control element. Alternatively, the first and/or the second flow control element may be a flow-controlled damper. One preferred form for the fine flow control element is a device which is designed or controlled to provide equal resolution performance over its entire operating range. More specifically, the device may provide a linear change in flow for changes in element position over the devices operating range. For some applications, only the second element is controllable, the first element being a constant volume or a two-state device.

For some embodiments, the control circuitry includes a reduction element for applying most, but not all, of the electrical indication to control the first flow control element. A fine control is also provided which is operative in response to the difference between the desired flow and the flow through the first control element. The reduction element may, for example, be a multiplier which multiplies the electrical indication of desired flow by a large fraction (for example, 95%) or may be a summer element which subtracts a value from the desired flow indication, which value includes a small percentage (for example, 5%) of the flow value indication. Where an equal resolution device is utilized for the fine control element, what is subtracted in the summer may be a selected fixed value. With a constant volume first element, controls to compensate for flow variations are applied only to the second fine flow control element.

Where the device is being used in a sealed room environment, and in particular to perform the function of the tracking flow control element in such environment, the electrical indication of desired flow would be indicative of flow through the master or non-tracking flow control element and the control circuitry could include first circuitry responsive at least in part to the flow signal for controlling the first flow control element and second circuitry responsive at least in part to a pressure error or variation in the room for controlling the second flow control element, or it could include circuitry responsive to both the flow signal and to the pressure error for controlling both flow control elements. It should at this point be noted that the term "circuitry" as used above and throughout the application is being used in a generic sense to indicate either hardware circuitry for performing the specific function or software running on a special purpose or general purpose processor for performing the indicated function. In the sealed room environment discussed above, the second circuitry may include a room pressure sensor, a pressure error indicator generating an output which is a function of the difference between sensed room pressure and a selected set point pressure and a room characteristic compensator responsive to a pressure error indication for providing a control signal to the second fine control element. The room characteristic compensator would for one embodiment multiply the pressure error by a constant which is a function of various characteristics of the sealed room. The first circuitry for the above embodiment generates a control output which is a function of the electrical indication and a feedback indicator. The feedback indicator is a function of both the flow through the first flow control element and of an indication of flow variance from a selected flow set point for the second flow control element. The first circuitry also preferably includes inhibit circuitry for preventing the first flow control element from reacting to small variations in flow or room pressure.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1A:
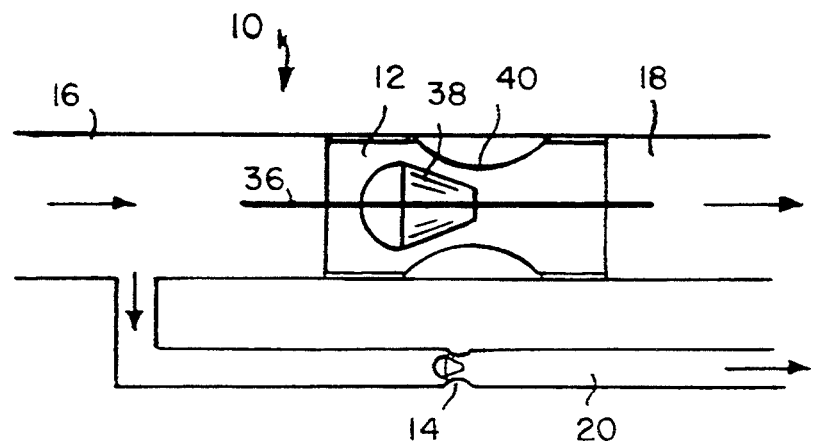
FIG. 1A is a diagrammatic side cutaway view of a parallel venturi valve embodiment of a gas flow control device in accordance with the teachings of this invention.

Referring first to FIG. 1A, a gas flow control device 10 in accordance with the teachings of this invention is shown as including a first venturi valve 12 and a second smaller venturi valve 14 connected in parallel in a gas flow plenum 16. The output sides 18 and 20 of the valves 12 and 14, respectively, may be vented separately or may be connected together (as shown for FIGS. 1B and 1C) for venting or as a gas flow input to a room or other space. For all embodiments of the invention, one of the devices, for example the valve 12, will provide coarse gas flow control and will generally be much larger than the other flow control element 14 which provides fine gas flow control. The exact difference in gas flow capacity between the two devices will vary with application; for some preferred applications, the flow through the larger coarse flow control element/valve may be 10 to 50 times greater than that through the fine flow control element/valve.

Figure 1B:
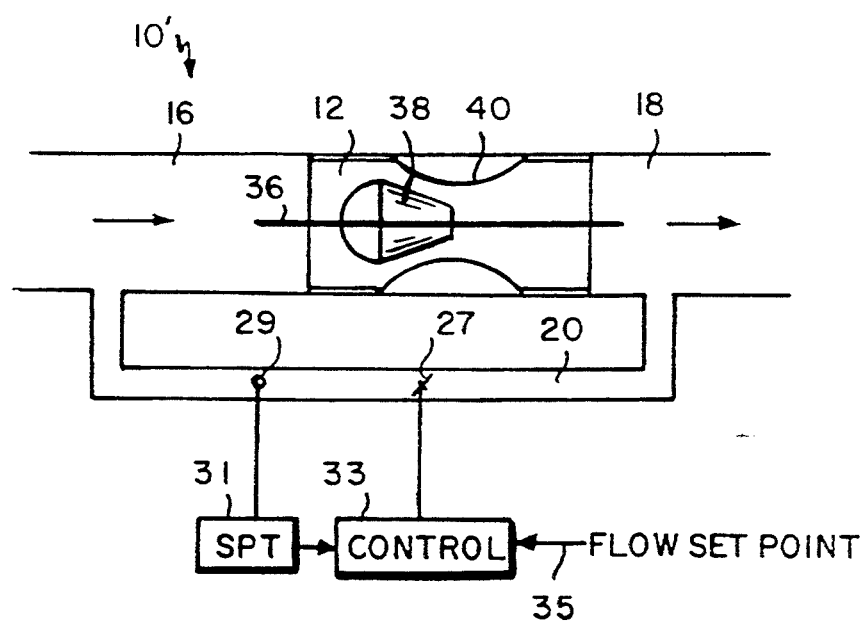
FIG. 1B is a diagrammatic side cutaway view of a parallel embodiment of a gas flow control valve utilizing a venturi valve as the coarse element and a damper as the fine control element.

While in FIG. 1A valves of substantially different size have been shown for the two valves, similar results may be achieved utilizing valves which are closer in size (or even the same size), but are biased to operate at different points on their flow control curves so as to provide greater and lesser flows. Further, while venturi valves which are substantially pressure independent are shown for the embodiment in FIG. 1A, other types of gas flow control elements may be preferable in some applications. In particular, FIG. 1B illustrates an alternative embodiment 10' wherein a venturi valve 12 is still used as the coarse flow control element, but a damper 27 is substituted for venturi valve 14 as the fine flow control element. A flow detection device 29 is provided in the bypass plenum to detect flow through this plenum. The output from detector 29 is connected to a static pressure transmitter (SPT) which converts the detected flow into a signal which is applied as one input to a controller 33. The other input to controller 33 is a signal on line 35 indicative of a desired set point flow for damper 27. The error output from controller 33, which is indicative of the difference between desired and actual flow through the damper, is applied to control the position of damper 27. The flow set point signal on line 35 would typically be such as to cause flow through damper 27 to be sufficiently above the minimum flow value for the damper so that the damper will not bottom out in normal operation.

Figure 1C:
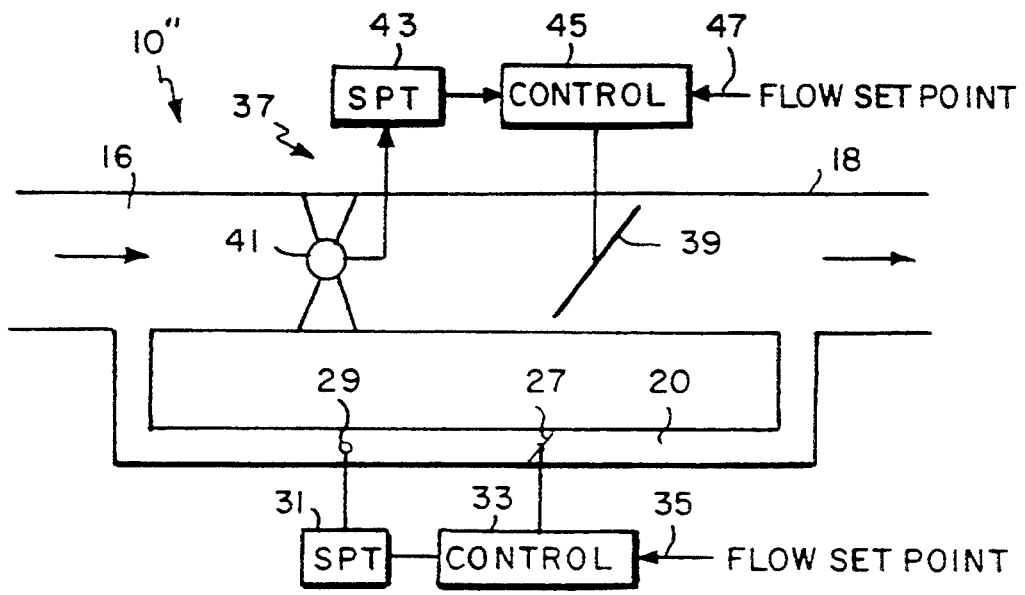
FIG. 1C is a diagrammatic side cutaway view of a parallel damper embodiment of a gas flow control device in accordance with the teachings of the invention.

FIG. 1C shows still another alternative configuration 10" for the flow control element wherein the bypass arrangement for fine flow control is the same as that shown in FIG. 1B, but a damper arrangement 37 is substituted for the venturi valve 12. The damper arrangement includes a damper 39 and a flow detection element 41 in the main plenum with the output from the flow control element being connected as the input to an SPT circuit 43. The output from circuit 43 is connected as the actual flow input to control circuit 45, the other input to this circuit being a flow set point signal on line 47. The flow set point would be at a predetermined point within the operating range of damper 39. The output from control circuit 45 is applied to control the position of damper 39 and thus the flow through the main plenum. Another possible embodiment is to use a damper 39 as the coarse flow control element and a damper 14 as the fine flow control element.

In some applications, the flow controls for fine flow damper 27, including flow detector 29, SPT31 and control 33, may not be required since only the resolvability of the damper is of interest, not absolute flow therethrough. An example of such an application is shown in FIG. 3B where fine flow is controlled in response to pressure errors and further control in response to flow may not be required.

While venturi valves or dampers are shown as the control elements for the embodiments of FIGS. 1A–1C, such devices are shown primarily because they are the most commonly used for these applications and other devices known in the art which are adapted to control gas flow may be used as appropriate either as the fine flow control element or the coarse flow control element in accordance with the teachings of this invention. In particular, as will be discussed later, control for the fine flow control element may be simplified where such element provides equal resolution performance over its entire operating range. One way in which this objective may be achieved is by providing a flow control device which provides a linear change in flow in response to changes in the linear or angular position of a flow restricting element (i.e. cone 38 or the damper blade) that resides inside the device. While the characteristic of some dampers may be substantially linear over some operating range, the above objectives may at this time be best achieved by mechanically modifying the characteristic curves of one of the existing devices, for example a venturi valve, to achieve the desired flow/position characteristic.

Figure 1D:
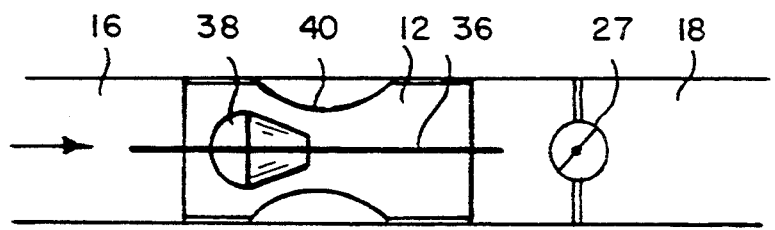
FIG. 1D is a diagrammatic side cutaway view of the series embodiment of a gas flow control device utilizing a venturi valve as the coarse flow control element and a damper as the fine flow control element.

FIG. 1D illustrates still another embodiment of the invention wherein the coarse flow control element, illustrated in FIG. 1D as a venturi valve 12, and the fine flow control element, illustrated in FIG. 1D as a damper 27, are connected in series in the main plenum rather than in parallel. As with prior embodiments, the element 27 would be selected, both in terms of its size and operating range, so as to affect a very small percentage of the total flow, perhaps something in the 5% range. Restrictions on flow imposed by fine flow control element 27 alter the pressure differential across coarse flow control element 12. Since this element is pressure-responsive at least in part, these variations in pressure cause fine adjustments of the flow through valve 12 which have a much lower resolution than is achievable through movement of shaft 36 and cone 38. The arrangement shown in FIG. 1D thus permits precise flow control through the system. However, to achieve such control, the coarse flow control element must be an element such as a venturi valve which responds to pressure variations thereacross. While in FIG. 1D, the fine flow control element is downstream from the coarse flow control element, this is not a limitation on the invention and the order in which the flow passes through these elements may be reversed.

Figure 2A:
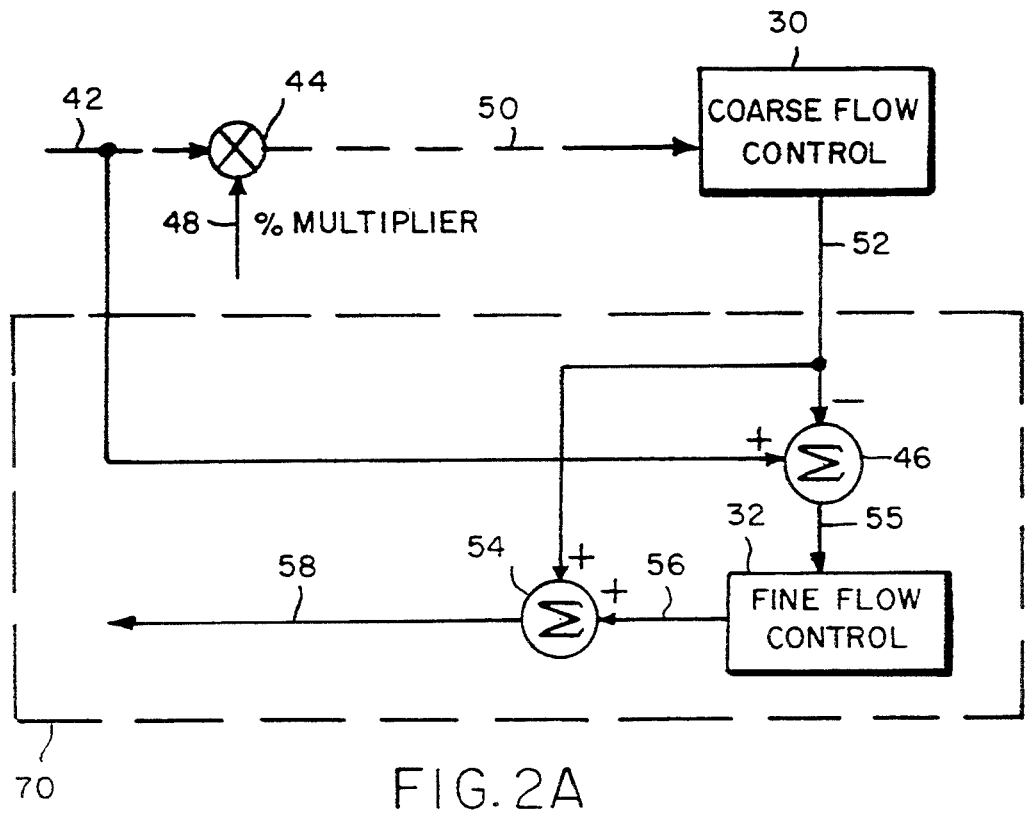
FIG. 2A is a schematic block diagram of one embodiment of control circuitry for a gas flow control device of the type shown in FIG. 1.

FIG. 2A illustrates a control circuit which might be utilized in conjunction with the devices 10 of FIGS. 1A–1C to achieve the desired coarse and fine control. In this circuit, a coarse flow control circuit 30 is provided for controlling flow through coarse flow control valve 12 (or damper 39) and a fine flow control circuit 32 is provided for controlling flow through fine flow control valve 14 (or damper 27). Control circuits 30 and 32 may be standard flow controls utilized in conjunction with valves such as venturi valves or dampers as appropriate. For example, for venturi valves such controls may include an electromagnetic, hydraulic or pneumatic actuator which is electrically controlled for moving shaft 36 (FIG. 1A) of a valve to a desired position. This causes the corresponding cone 38 attached to the shaft to be moved to a selected position in the throat 40 of the valve, thereby permitting a selected gas flow through the valve. A potentiometer or other suitable device which changes its electrical resistance or otherwise changes its electrical output as a function of the position of shaft 36 provides a feedback output which is indicative of the current shaft position. Since the relationship between shaft position and flow for such devices is fixed, the output from this device is also an indication of flow through the valve and is sometimes referred to hereinafter as the flow feedback signal. A more detailed description of flow controllers suitable for use, for example as the flow controllers 30 and 32 is provided in the aforementioned parent application and in application Ser. No. 07/822,088, filed Jan. 17, 1992 U.S. Pat. No. 5,304,093.

The input to the circuit of FIG. 2A is a command signal on line 42, the value of which is indicative of the desired gas flow through device 10. This signal may be applied as one input to multiplier circuit 44 and as a positive input to summing circuit 46. The other input to multiplier circuit 44 is an input on line 48 which is indicative of a percentage multiplier. The value of the multiplier on line 48 is selected so as to control fine flow valve 14 to operate well below its maximum flow capacity, but sufficiently above its minimum flow so that the valve will not bottom out. It should be noted at this point that most valves, and venturi valves in particular, do not fully close so that there is always a minimum flow above zero. In order to permit fine adjustments to be made in both directions, it is important that the valve operate sufficiently above this minimum flow value so that the valve will not bottom out in seeking to make small reductions in flow volume since such bottoming out would prevent the valve from performing effectively its fine tuning adjustments.

The output from multiplier 44 is applied as the control input to coarse flow control circuit 30. The difference in the value on line 42 and the value on line 50 should be roughly within the resolution range of coarse flow valve 12. The actual position or flow for valve 12 (i.e. the feedback output) on line 52 from coarse flow control circuit 30 is connected as the second, negative input to summing circuit 46 and as a positive input to summing circuit 54. The output from summing circuit 46, which is the difference between the desired flow as indicated by the signal on line 42 and the actual flow through coarse flow control element 30 as indicated by the signal on line 52 is applied as the control input to fine flow control circuit 32. Fine flow control device 14 is thus controlled to provide a flow which is equal to the difference between that through coarse flow control element 12 and the desired flow. The feedback output on line 56 from fine flow control circuit 32 is connected as the other positive input to summing circuit 54, the output on line 58 from this summing circuit being indicative of the actual gas flow through the device 10.

At start-up, or when there is significant transition in the desired gas flow through device 10, there will be a significant difference between the desired flow as indicated by the signal on line 42 and the actual flow through coarse flow control 30 as indicated by the signal on line 52. This will cause a large output on line 55 from summing circuit 46 which will saturate valve 14 in the appropriate direction (i.e. either fully open or fully closed as appropriate). A signal on line 50 will also cause cone 38 for coarse control element 12 to be rapidly moved to the requisite position to achieve the desired flow. The fine flow control element 14 being saturated in the proper direction during this period permits this valve to make its maximum contribution to reaching the new desired flow as quickly as possible; however, because of its relatively small size, the contribution of this valve is not substantial.

As coarse flow device 12 approaches the position to provide the new desired flow, the output on line 55 is reduced to be within the operating range of fine flow control element 14, permitting this element to start performing a fine flow control. This process continues until the coarse flow control valve 12 reaches the limits of its resolution, after which fine flow control valve 14 continues to react to any difference signals appearing on line 55 to precisely control the flow to the desired value. To the extent small variations in flow may be required thereafter (as a result, for example, of small pressure variations in the sealed space being controlled), fine flow control element 14 may be adjusted to precisely accomplish such flow variations. The operation for a device of the type shown in FIG. 1B or 1C would be the same as that described above for FIG. 1A, the major difference being in the type of controls or controllers utilized.

The portion of line 42 which is input to multiplier 44 and output line 50 from this multiplier are shown in dotted line to illustrate that these lines and the multiplier 44 are optional for an embodiment of the invention wherein the flow is contemplated as being fixed or substantially fixed so that a constant volume or a two-state device may be utilized as the coarse flow control instead of a variable control such as shown in FIGS. 1A-1D. Under these circumstances, any change in flow which might occur between the desired flow on line 42 and the coarse flow as indicated on line 52 would be compensated for solely by variations in fine flow control 32. With a two-state coarse flow controller, the controller might operate in a first higher flow state to permit rapid adjustments to a transition such as when a door is opened or during initial start-up, but would otherwise operate in a constant flow state.

One option when operating with such valve is not to have a feedback signal from the coarse flow control to the fine flow control since this flow is known, but to have a signal indicative of this flow stored and applied as an input to the fine flow control. Other similar options would suggest themselves to those skilled in the art.

Figure 2B:
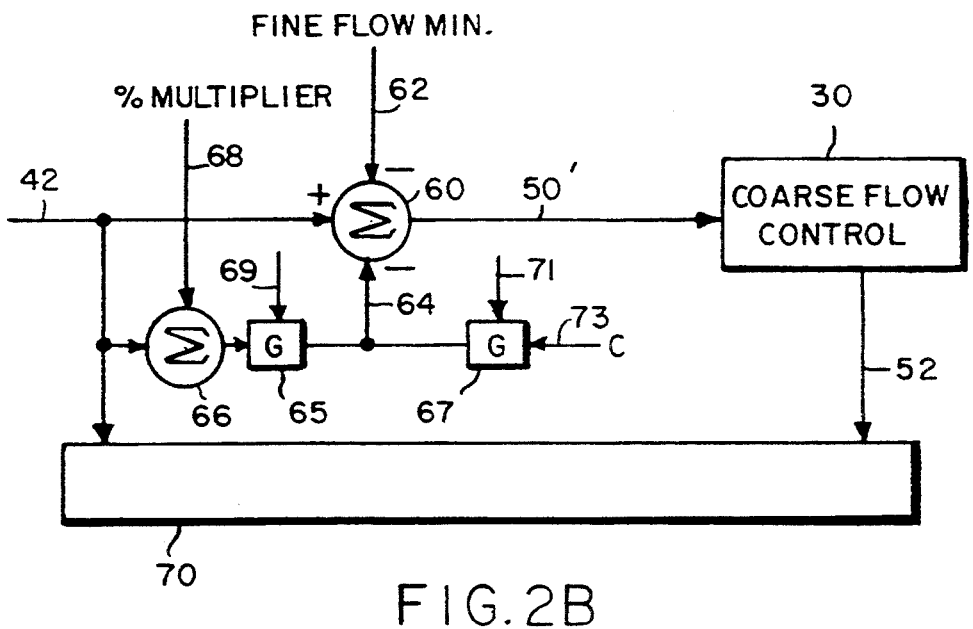
FIG. 2B is a simplified schematic block diagram of alternative control circuitry embodiments.

FIG. 2B illustrates alternative control circuitry which differs from that shown in FIG. 2A only in that the control signal on line 50' to coarse flow control circuit 30 is derived from a summing circuit 60 rather than from multiplier 48. The positive input to summing circuit 60 is the signal on line 42. Negative inputs to summing circuit 60 are derived from lines 62, which is indicative of the minimum flow through fine flow control device 14, and from line 64. For purposes of illustration, line 64 is shown as receiving outputs from a pair of gates 65 and 67 each of which has an enable input 69 and 71, respectively. Lines 69 and 71 may for example be the outputs from a flip-flop such that either gate 65 or 67 is enabled at any given time, but not both. Input line 73 to gate 67 contains a constant value, the function of which will be described shortly. The input to gate 65 is the output from multiplier 66. The inputs to multiplier 66 are line 42 and percentage multiplier line 68. The percentage multiplier on line 68 would be substantially the mirror image of the multiplier on line 48, being, for example, in the 2% to 10% range. The value of the signal on line 50' would thus be substantially the same as the value on line 50. The remainder of the circuit of FIG. 2B as illustrated by the box 70 is the same as the corresponding circuit within the dotted box 70 of FIG. 2A and the operation of the circuit of FIG. 2B is substantially identical to that of the circuit in FIG. 2A except that, when gate 67 is enabled, the amount subtracted from the command signal is constant regardless of the magnitude of the command signal, rather than varying as a percentage of this signal. The circuit may be operated in this mode when the flow control element being utilized is one which yields equal resolution performance over its entire operating range rather than one for example which exhibits a non-linear relationship between flow change and control element position. Thus, the circuit of FIG. 2B is for illustration purposes only and, for a given flow control element, the negative input to summing circuit 60 would be either constant line 73 or the output from multiplier 66. As with the percentage multipliers, the constant C would be selected so that the control inputs to the fine flow control 32 cause this element to normally operate within its operating range. The same variations discussed above for FIG. 2A could also be made in FIG. 2B if a constant volume flow control element is used as the coarse flow controller.

Figure 3A:
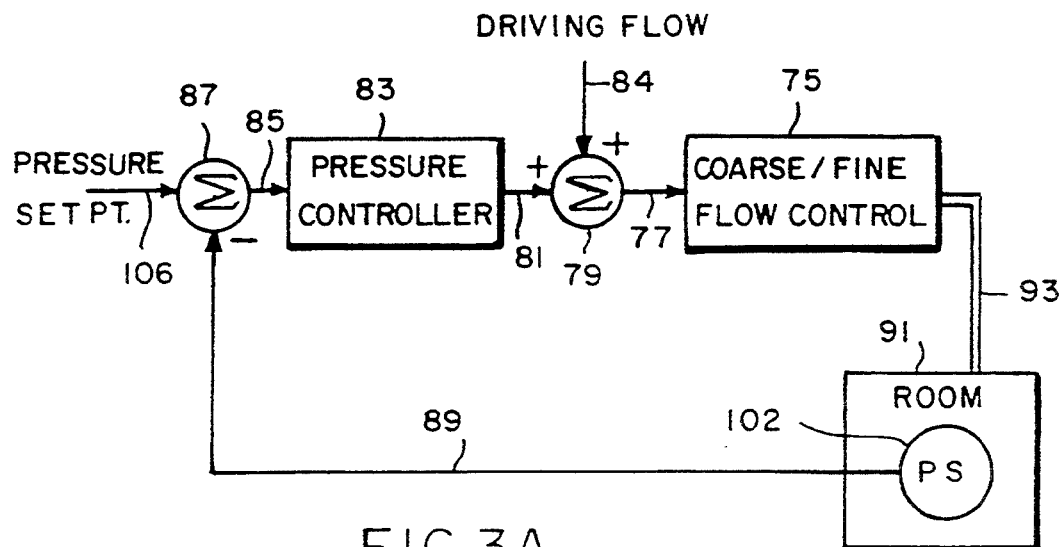
FIG. 3A is a schematic block diagram of a first embodiment of control circuitry for a gas flow control device of the type shown in FIGS. 1 when used as a tracking valve in a sealed room application.

FIG. 3A illustrates a flow control embodiment utilizing a coarse/fine flow control 75, which may for example be the control circuit shown in FIG. 2A or FIG. 2B, which embodiment might be utilized where the flow control device is the tracking flow controller in a sealed room system of the type discussed in the parent application. In particular, it is assumed that the flow control device, which consists of both a fine flow control element and a coarse flow control element connected substantially as shown for example in FIGS. 1A-1D, is the exhaust valve which is controlled to track the supply valve with some offset so as to maintain a desired pressure level (either positive or negative) in the room.

Referring to FIG. 3A, the input to coarse/fine flow control 75 is output line 77 from summing circuit 79. The inputs to summing circuit 79, both of which are positive, are output line 81 from pressure controller 83 and feedback line 84 from the driving or master flow controller. The input to pressure controller 83 is output line 85 from summing circuit 87. Summing circuit 87 has as a positive input the desired pressure set point on line 106 and as a negative input output line 89 from pressure sensor 102 located in the room or other enclosure 91 being controlled. The double line 93 between flow control 75 and room 91 indicates the air flow connection between these elements and this connection in conjunction with the characteristics of room 91, which may vary for example if a door to the room is opened or if there is some other change occurring in the room, determine the room pressure sensed by pressure sensor 102.

In operation, pressure error outputs on line 85 are converted to a flow by pressure controller 83. The signal on line 77 is therefore indicative of the flow through the driving or master flow control plus or minus any flow requirement to compensate for variations in desired pressure within room 91. This signal is applied to flow control 75 which operates in the manner described for example with respect to FIG. 2A or 2B to provide the corresponding flow exiting room 91. As before, large changes in flow resulting for example from a change in flow through the driving or master flow controller, or resulting from a large change in room pressure caused for example by a door being opened, are compensated for by the coarse flow control element, while small variations in desired flow, resulting for example from small variations in room pressure, which flow variations would normally fall within the dead band of the coarse flow controller, and thus not be resolvable by such controller, are responded to by the fine flow control element.

FIG. 3B illustrates an alternative sealed room flow control embodiment utilizing a coarse flow control 30 and a fine flow control 32. Referring to FIG. 3B, coarse flow control 30 receives a control input on output line 80 from summing circuit 82. Positive inputs to summing circuit 82 are obtained on line 84 which is assumed to be the feedback output from the supply valve, on output line 86 from compensation/desensitizer circuit 88 and possibly on line 90 which provides the desired offset. The input on line 90 is optional since this control can be obtained as a result of the pressure errors in the manner to be described shortly, and in most applications the input 90 would not be required. Compensation/desensitizer circuit 88 may, for example, include a slow charge capacitor which would generate an output on line 86 for large or long-lasting inputs received by the circuit, but would not generate an output for small or spurious outputs, One purpose of circuit 88 is thus to prevent spurious variations in the flow setting for coarse flow control element 12. Circuit 88 also contains sufficient gain to stabilize the feedback loop.

The input to circuit 88 is output line 94 from summing circuit 96. A negative input to summing circuit 96 is a signal on line 98 which is indicative of a desired set point for the fine flow control valve 14. As discussed previously, this set point should be at an operating point of the valve, damper or other control element that provides good sensitivity and resolution of control, but should be sufficiently above the minimum operating point of the valve so that the valve will not bottom out when performing normal fine control adjustments. Similarly, the operating point should be sufficiently below the valve or damper's maximum operating point to prevent clamping at this maximum value. The positive input to summing circuit 96 is feedback output line 100 from fine flow control circuit 32. The signal on line 94 is thus the error signal between the actual position/flow for fine flow valve 14 and the set point value on line 98 for this valve.

The actual pressure in the sealed room is detected by a room pressure sensor 102. A signal indicative of the sensed pressure is applied as a negative input to summing circuit 104, the positive input to this summing circuit being a desired pressure set point on line 106. The pressure error signal outputted from circuit 104 on line 108 is applied as one input to multiplication circuit 110, the other input to this circuit being a signal on line 111 which is proportional to a room characteristic constant K. This constant, which will vary with the size and other features of the room, and may for example be determined empirically for a given room, determines the relationship between pressure error and required flow. Therefore, the output from multiplier circuit 110 on line 112 is indicative of the flow required to achieve the desired pressure. The signal on line 112 is applied as the control input to fine flow control 32. Other techniques known in the art for achieving such pressure error control signal might also be utilized.

In operation, changes in the supply flow as indicated on line 84 will cause variations in the flow through coarse flow control valve 12 under control of coarse flow control circuit 30 so as to render the flow through the supply valve and coarse flow control valve 12 substantially equal. Since any mismatch between supply flow and exhaust flow will result in a pressure variation in the room, such pressure variation will result in a signal on line 108 which causes an adjustment in fine flow control 32. To the extent the pressure difference signal on line 108 is relatively small, the movement of fine flow control 32 from the fine flow set point will also be relatively small, resulting in an output signal on line 94 which is within the resolvability or deadband of the coarse flow control element. The resulting signal on line 86 therefore does not result in any change in the flow through the coarse flow control element.

However, to the extent there is a relatively large pressure variation in the room, for example as the result of a door being opened, a fume hood being turned on or perhaps a change in the pressure set point, the signal on line 112 to fine flow control 32 will be large enough to drive the fine flow control beyond the deadband, and possibly even to or close to saturation. This will result in a relatively large output signal on line 94. Assuming this condition is not an instantaneous or spurious variation, it will also result in an output from circuit 88 on line 86 which will cause an appropriate adjustment in flow through coarse flow control valve 14 to restore pressure to the desired pressure set point. As the pressure in the room approaches the pressure set point, the value of the signal on line 108 goes down, permitting the fine flow control element 14 to move back toward its set point and therefore reducing the output on line 94. When the signal on line 94 is again within the deadband of the coarse flow control element, further pressure controls are achieved solely by the fine flow control element 14. From the above, it is apparent that a desired offset between supply and exhaust to achieve a desired pressure set point can be achieved with the circuit of FIG. 3B without the need for the offset input 90 and that this input may therefore be dispensed with. A series connected control device of the type shown in FIG. 1D is particularly adapted for use with a circuit of the type shown in FIG. 3B.

Figure 3C:
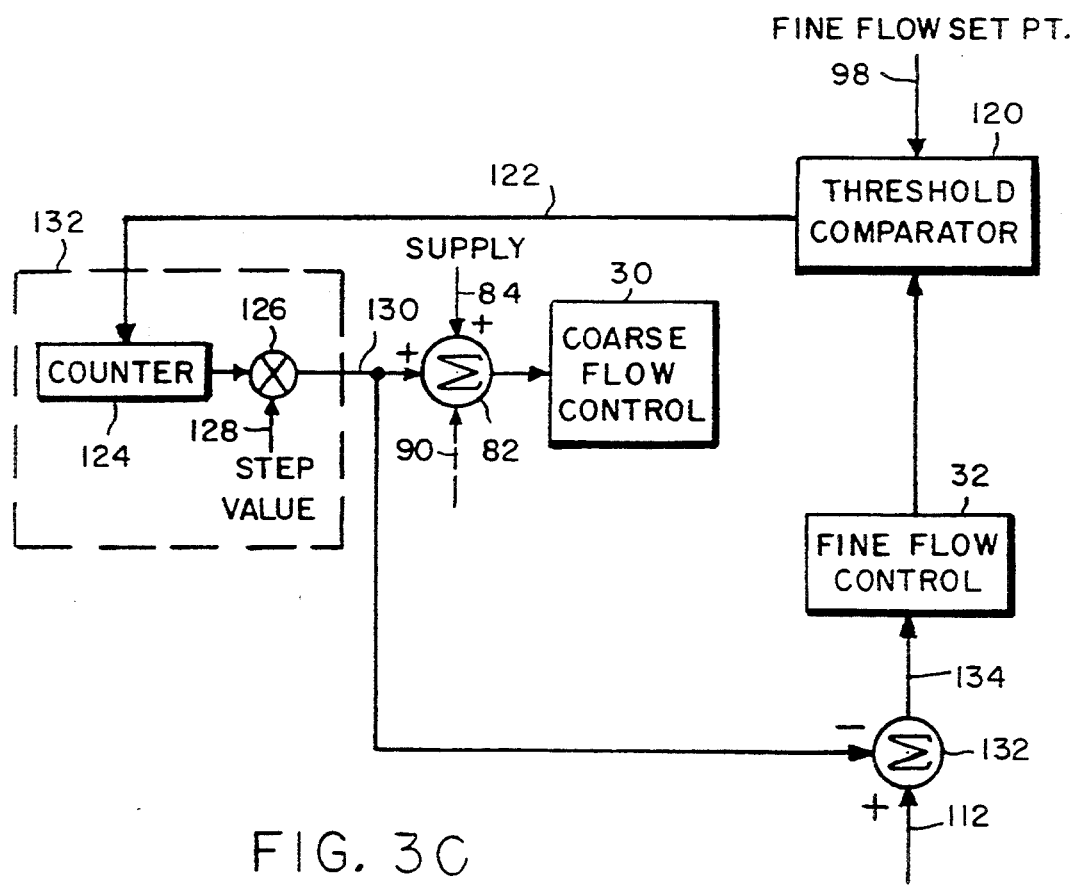
FIG. 3C is a schematic block diagram for a third embodiment of control circuitry for a gas flow control device of the type shown in FIGS. 1 when used as a tracking valve in a sealed room application.
Figure 3B:
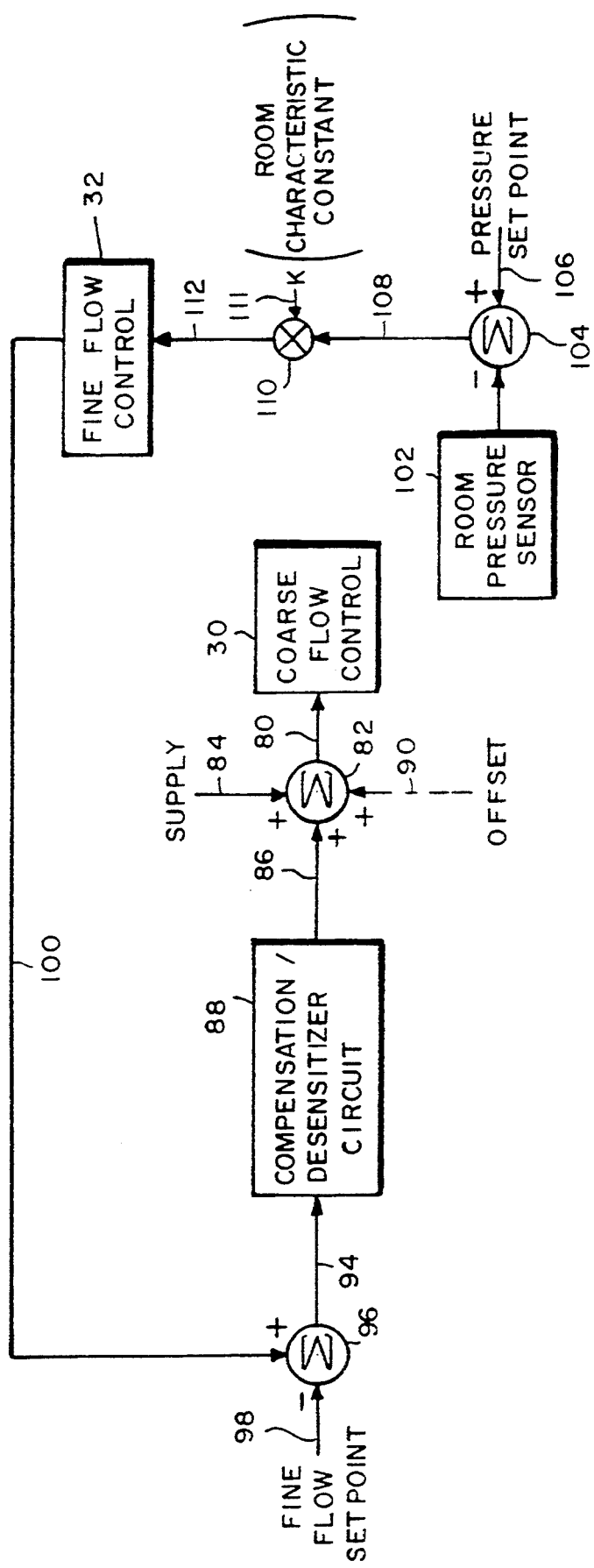
FIG. 3B is a schematic block diagram for a second embodiment of control circuitry for a gas flow control device of the type shown in FIGS. 1 when used as a tracking valve in a sealed room application.

FIG. 3C illustrates still another embodiment of the invention wherein the feedback output from fine flow control 32 is applied as one input to a threshold comparator circuit 120, the other input to this circuit being the fine flow set point value on line 98. Circuit 120 thus generates an output pulse on line 122, which pulse may be positive or negative, when the difference between the fine flow control setting and the set point for this element are greater than some threshold, which threshold should be roughly the resolvability of the coarse flow control. A positive pulse on line 122 is applied to increment a counter 124 and a negative pulse on this line is applied to decrement the count in this counter. The count in counter 124 is applied as one input to a multiplier 126, the other input to which is a line 128 having applied thereto a constant value which is a function of the threshold for circuit 120. The output on line 130 from multiplier 126 is thus a value which is proportional to the amount by which fine flow control 32 is over its threshold. The signal on line 130 is applied to summing circuit 82 to cause an appropriate adjustment in coarse flow control 30 to relieve the pressure on fine flow control 32 and is also applied as a negative input to summer 132 the positive input to which is line 112 (FIG. 3B). The output 134 from summer 132 is applied to fine flow control 32 to move this control in the appropriate direction to return to its set point value. If the pressure error on line 108 is still great enough so that fine flow control 32 deviates from its set point value by a value in excess of the threshold, threshold comparator 120 will continue to generate output pulses incrementing or decrementing counter 124 as appropriate until the desired equilibrium is again restored. As indicated by dotted box 136, counter 124 and multiplier 126 may be part of a computer circuit or these functions may be performed by suitably programming a general purpose or special purpose processor.

While the circuits of FIG. 3B and 3C, with independent control for the coarse flow and fine flow control elements, are intended for use in a sealed room environment where room pressure error is utilized to control the fine flow element, there are other applications where independent control of these elements may be desired. For example, to make the fine flow control less susceptible to noise in the flow control input, it may be desirable to provide separate control signals to each element with the desired cfm change per unit of signal being much less for the fine flow control signal than that for the coarse flow.

A precise gas flow control method and apparatus, including a novel flow control device and various control circuitry for use therewith, have thus been provided. As indicated earlier, while venturi valves are utilized for a preferred embodiment of the invention, other suitable flow control elements may be utilized in suitable applications while practicing the teachings of the invention. Where the application is a sealed room control, it is desirable, as indicated in the parent application, that the flow control elements provide some leakage (i.e. that at least one of the elements utilized for supply or exhaust be at least slightly pressure dependent). The leakage required may normally be obtained with standard venturi valves or the valves may be slightly modified to achieve such leakage. While for an embodiment such as that shown in FIG. 1A, the leakage may be provided by either one or both of the valves 12 and 14, it is preferable that such leakage be available from the larger valve 12 since the effect on flow by the small valve 14 may not be adequate.

It should also be understood that while exemplary control circuits have been shown in the figures, and these control circuits have generally been illustrated utilizing discrete components, such circuits are not a limitation on the invention and other control circuitry suitable for achieving the desired coarse and fine control of gas flow utilizing a gas flow control device in accordance with the teachings of this invention might be utilized. Further, a programmed general purpose computer or a special purpose computer or processor may be utilized in place of discrete components or a combination of processor and discrete components may be utilized in practicing the teachings of the invention. Thus, while the invention has been particularly shown and described above with reference to preferred embodiments, the foregoing and other changes in form and detail may be made therein by one skilled in the art without departing from the spirit and scope of the invention.

What is claimed is:

1. A precision gas flow control device comprising:
   a first gas flow control element and a second gas flow control element, said second gas flow control element being operative to pass only a fraction of the flow passed by the first element, said first and second elements being positioned so that at least a portion of the gas flow passes through each flow control element;
   a flow signal indicative of desired gas flow through the device; and
   control circuitry responsive at least in part to said flow signal for controlling the first element to provide coarse gas flow adjustment to the gas flow and for controlling the second element to provide fine gas flow adjustment to the gas flow.

2. A device as claimed in claim 1 wherein said first and second flow control elements are positioned so as to pass the gas therethrough in parallel.

3. A device as claimed in claim 1 wherein said first and second flow control elements are positioned so as to pass the gas therethrough in series.

4. A device as claimed in claim 3 wherein the first flow control element is at least partially pressure independent so as to automatically make small adjustment in flow to compensate for pressure variations thereacross.

5. A device as claimed in claim 1 wherein said flow control elements are tracking flow control elements for a sealed enclosure, the flow signal being indicative of flow through a master flow control element, wherein the control circuitry is responsive, at least in part to both the flow signal and to a pressure error for the enclosure.

6. A device as claimed in claim 5 wherein the control circuitry includes first circuitry responsive at least in part to the flow signal for controlling the first flow control element and second circuitry responsive at least in part to a pressure error in the enclosure for controlling the second flow control element.

7. A device as claimed in claim 6 wherein said first circuitry generates a control output which is a function of the flow signal, and a feedback indicator, said feedback indicator being a function of both the flow through the first flow control element and of an indication of flow variance from a selected flow set point for the second flow control element.

8. A device as claimed in claim 7 wherein said first circuitry includes inhibit circuitry for preventing the first flow control element from reacting to spurious variations in at least one of flow and pressure.

9. A device as claimed in claim 2 wherein said control circuitry includes a reduction element for applying most, but not all, of said flow signal to control said first flow control element, and a fine control operative in response to the difference between said desired flow and the flow through the first flow control element.

10. A device as claimed in claim 9 wherein said reduction element is a multiplier which multiplies the flow signal by a large fraction.

11. A device as claimed in claim 9 wherein said reduction element is a summer which subtracts a value from said flow signal, which value includes a small percentage of said flow signal.

12. A device as claimed in claim 9 wherein the second flow control element yields substantially equal resolution performance over its operating range, and wherein said reduction element is a summer which subtracts a selected constant from said flow signal, the constant being selected to permit said second element to operate within its normal operating range.

13. A device as claimed in claim 1 wherein the gas flow through the second element is roughly 2% to 10% of the flow through the first element.

14. A device as claimed in claim 1 wherein the first flow control element is a venturi valve and the second flow control element is a smaller venturi valve.

15. A device as claimed in claim 1 wherein the second flow control element is a flow-controlled damper.

16. A device as claimed in claim 1 wherein the first and second flow control elements are flow controlled dampers.

17. A device as claimed in claim 1 wherein the first flow control element is a flow controlled damper and the second flow control element is a venturi valve.

* * * * *